United States Patent
Hayes et al.

(10) Patent No.: US 8,370,917 B1
(45) Date of Patent: Feb. 5, 2013

(54) SECURITY BRIDGING

(75) Inventors: Hassler Hayes, Munster Hamlet (CA); Nannra Anoop, Orleans (CA); John Watkins, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 1216 days.

(21) Appl. No.: 11/105,843

(22) Filed: Apr. 14, 2005

Related U.S. Application Data (60) Provisional application No. 60/565,063, filed on Apr. 23, 2004.

(51) Int. Cl.
*G06F 12/14* (2006.01)
*H04L 29/06* (2006.01)
*H04L 9/32* (2006.01)

(52) U.S. Cl. ........... 726/12; 713/151; 713/153; 713/168

(58) Field of Classification Search .................. None
See application file for complete search history.

(56) References Cited

U.S. PATENT DOCUMENTS

| | | | |
|---|---|---|---|
| 7,283,505 B1* | 10/2007 | Meenan et al. | 370/338 |
| 2002/0116637 A1* | 8/2002 | Deitsch et al. | 713/201 |
| 2003/0028805 A1* | 2/2003 | Lahteenmaki | 713/201 |
| 2003/0035409 A1* | 2/2003 | Wang et al. | 370/349 |
| 2003/0137976 A1* | 7/2003 | Zhu et al. | 370/354 |
| 2004/0103275 A1* | 5/2004 | Ji et al. | 713/150 |
| 2004/0215782 A1* | 10/2004 | Syed | 709/227 |
| 2005/0088977 A1* | 4/2005 | Roch et al. | 370/254 |
| 2005/0177515 A1* | 8/2005 | Kalavade et al. | 705/52 |

* cited by examiner

*Primary Examiner* — Philip Chea
*Assistant Examiner* — Fatoumata Traore
(74) *Attorney, Agent, or Firm* — Christopher & Weisberg, PA (57) ABSTRACT

A network media gateway is used to bridge trust between a Service Provider network and subscriber devices. The gateway is authenticated by the Service Provider by using knowledge of network topology. Subscriber devices are authenticated in response to subscriber input to the gateway via an interface. Trusted subscriber devices can be tightly coupled with the Service Provider network, thereby facilitating delivery of QoE. Mobile and remote subscriber devices may also be authenticated. The gateway may also facilitate establishment of VPNs for peer-to-peer communications, and dynamically adjustable traffic, policy and queue weightings based on usage patterns.

62 Claims, 7 Drawing Sheets

SECURITY BRIDGING

CROSS-REFERENCE TO RELATED APPLICATIONS

A claim of priority is made to U.S. Provisional Patent Application No. 60/565,063, filed Apr. 23, 2004, entitled NETWORK SECURITY AND NETWORK MEDIA GATEWAY.

FIELD OF THE INVENTION

This invention is generally related to the field of network security, and more particularly to security bridging associated with access technology to extend trust to subscriber devices.

BACKGROUND OF THE INVENTION

Network access technologies such as cable, DSL and satellite can be used to provide broadband services to homes and small businesses. However, the performance of each of these technologies can be inconsistent. For example, performance may be affected by weather conditions and network use by other subscribers. Further, the current generation of residential gateways, set top boxes and other broadband Customer Premises Equipment ("CPE") do not adequately support provision of a quantifiable Quality of Experience ("QoE"). One problem inhibiting deployment of equipment and services capable of maintaining QoE metrics is that relatively tight coupling of services, protocols, applications and network management are required to guarantee QoE. Such tight coupling is impractical when, as is currently the case, subscriber devices are viewed as insecure by service providers, and hence not trusted.

Another problem inhibiting deployment of equipment and services capable of maintaining QoE metrics in the home is that DiffServ-based QoS is basically static. Currently, a typical broadband home may have video, voice and data sessions managed by a single DiffServ algorithm. That single DiffServ algorithm is not typically capable of maintaining QoE when a subscriber employs multiple premium sessions with multiple applications. Similarly, numerous instances of sessions with multiple applications is problematic. Similarly, changing the set of premium sessions to another set over time is problematic.

SUMMARY OF THE INVENTION

In accordance with the invention, apparatus for providing communications service from a network to at least one subscriber device includes a gateway device capable of being authenticated by the network, and further capable of facilitating authentication of the subscriber device, whereby security may be bridged from the network to the subscriber device by authenticating both the gateway device and the subscriber device. Network topology may be used at least in-part to authenticate the gateway device. Subscriber input may be used at least in-part to authenticate subscriber devices. The gateway may provide an authenticated mobile subscriber device with a certificate of mobility that can be presented to the network outside the subscriber premises in exchange for service. Further, a remote device outside the subscriber premises may be authenticated for service by employing the gateway to validate the service on behalf of the remote device.

By authenticating both the gateway device and the subscriber device the Service Provider can reasonably trust the authenticated subscriber device, i.e., bridge trust to the authenticated subscriber device. Further, trusted subscriber devices can be tightly coupled with the gateway and other devices in the Service Provider network because they are deemed to be secure and trusted. Hence, providing a quantifiable QoE is facilitated by bridging of security via the gateway.

The gateway may also be employed to support self-learning for queuing and application mapping. For example, the gateway may function as a policy enforcement point for delivery of multiple, simultaneous sessions of varying media with differing performance requirements, which may change in real time, with deterministic Quality of Experience ("QoE") such that individual services can be billed. A gateway agent learns the behavior of the subscriber's LAN and data usage patterns through observation. Once a usage pattern is recognized, the gateway policy and traffic model is updated. Further, queue weightings may be dynamically adjusted based on current usage to allow for the proper session service quality levels to be met. Because the queue algorithms running over time have changing weightings, QoE support is improved relative to static weighting.

The gateway may also be employed to support peer-to-peer services. An authorized gateway containing a VPN client detects Peer-to-peer applications associated with the subscriber. In response to detection of operation of a peer-to-peer application the gateway notifies the Service Provider in order to enable billing. Further, if multiple users are participating in peer-to-peer transactions with the subscriber then the subscriber's gateway can establish a closed VPN network of authorized users. The VPN is establish by the gateway uploading a VPN client to each remote user's device.

DETAILED DESCRIPTION

Figure 1:
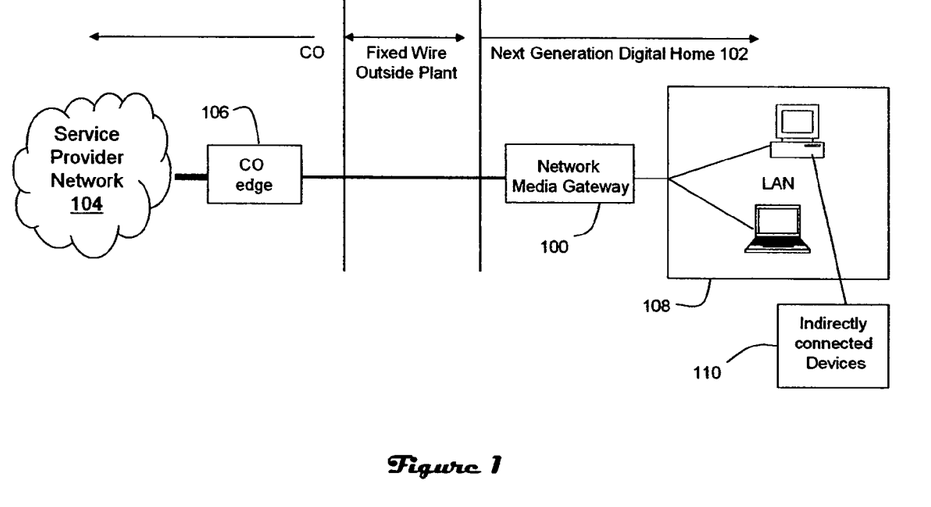
FIG. 1 illustrates security bridging between a Service Provider network and subscriber devices.

Referring to FIG. 1, a network media gateway (100) is used to bridge trust to the subscriber premises (102). The gateway is connected between the Service Provider's network (104) and the subscriber premises. In the illustrated embodiment the gateway is a CPE device disposed at the subscriber premises, interconnecting a Central Office ("CO") edge device (106) with in-home devices (108). However, the gateway need not necessarily be disposed at the subscriber premises.

Figure 2:
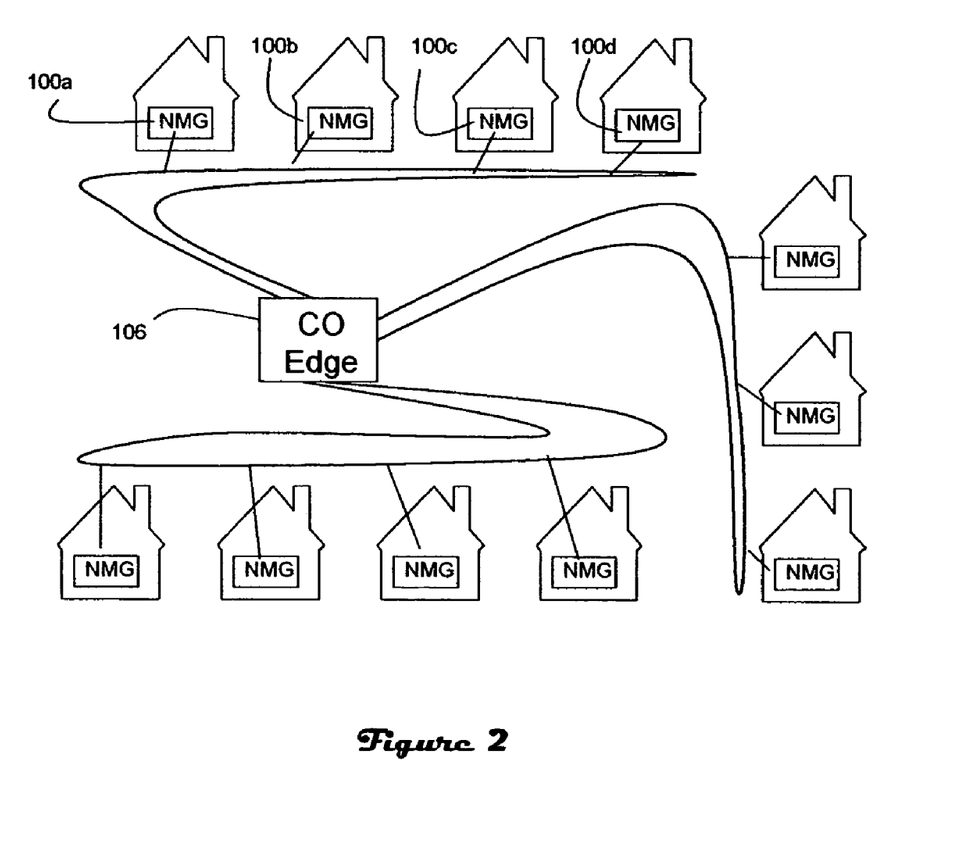
FIG. 2 illustrates use of network topology to facilitate gateway authentication.

Referring to FIGS. 1 and 2, the gateway (100) is trusted by the Service Provider based on successful execution of an authentication procedure. One technique by which the Service Provider can authenticate the gateway is by using knowledge of network topology. Individual gateways (100a-100d) on a local loop associated with the CO edge device (106) are identifiable via a unique identifier such as with a MAC address. The gateway identifier is known to the Service Provider because the Service Provider installs the gateways. Further, the Service Provider knows information about the subscriber associated with each individual gateway because that subscriber is a customer of the Service Provider. For example, the Service Provider knows where the gateway is connected on the loop. Further, the Service Provider knows which physical media, e.g., set of wires and which loop, is associated with communications with each subscriber's home and each individual gateway. Such identifying information could be maintained, for example, in a head-end device that monitors topology and generates an alert when, for example, an unauthorized gateway is connected to the network, or when an authorized gateway is moved within the network or removed from the network. In the absence of an alert, the gateway is trusted once initially authenticated. Topology-based authentication can be indirectly augmented by constructing the gateway in a tamper-proof enclosure, such as in accordance with FIPs 140-2.

Once authenticated by the Service Provider, the gateway (100) is permitted to provide a certain set of services to subscriber devices (108) that are directly connected with the gateway (via LAN or physical media) in order to provide the services to the subscriber. The services might include, but are not limited to, video, voice and data services. Examples of secondary, in-home devices include but are not limited to: a co-located digital media adapter; a co-located secondary Personal Computer ("PC"); CPE in another location within the Service Provider WAN; and CPE on a foreign Service Provider WAN that does not use the CPE Technology of the original Telco network. Before a service is provided to a subscriber device the gateway authenticates that device for the service. Further, authenticated subscriber devices can be tightly coupled with the gateway and other devices in the Service Provider network because they are deemed to be secure and trusted. Hence, providing a quantifiable QoE is facilitated by bridging of security via the gateway.

Under certain circumstances the gateway may permit authentication of subscriber devices (110) which are only indirectly connected with the gateway. In particular, the gateway may permit authenticated secondary devices to authenticate other devices. Depending on the capabilities of the secondary device, such extended authentication may be executed independently or with assistance from the gateway. For example, if the authenticated secondary device is capable of executing authentication protocols with other devices then that authenticated secondary device may be permitted to independently bridge security. However, if the authenticated secondary device is incapable of independent execution of authentication protocols then the gateway may function as an authentication proxy on behalf of the authenticated secondary device.

Figure 3:
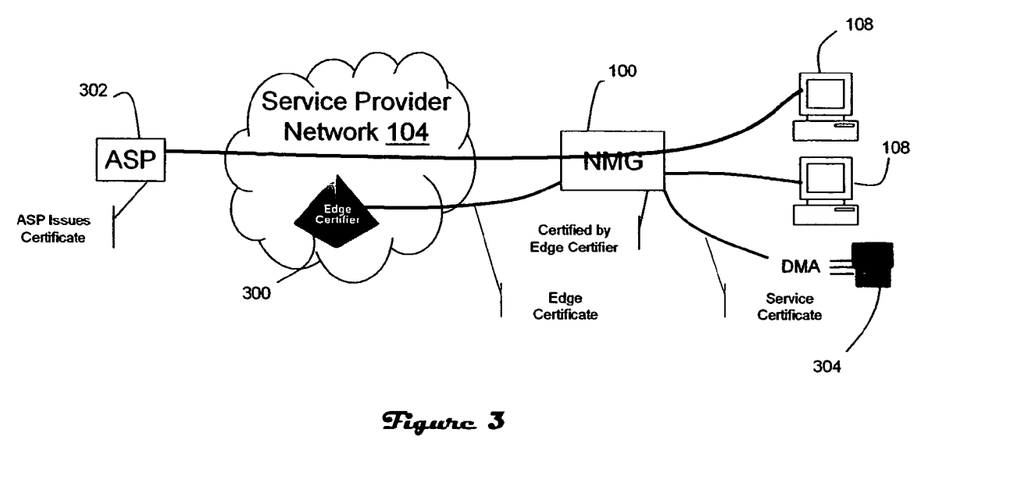
FIG. 3 illustrates certificate management via the gateway.

Referring now to FIG. 3, one technique for authenticating subscriber devices (108) is with a user interface for certificate management. Initially, the gateway (100) is fully authenticated as already described above. The gateway is then certified by an edge certifier (300) of the Service Provider network (104) for providing individual services, including managing distribution of certificates within the subscriber LAN. Once certified, the gateway (100) detects incoming certificates from the Service Provider network (104), including the destinations of the certificates. For example, an Application Service Provider (300) may issue a certificate identifying as a destination one of the subscriber devices (108). An encrypted record of each new certificate and associated destination is maintained by the gateway. A user interface (304) of the gateway (100) can then be used by the subscriber to manage which subscriber devices (108) on the subscriber LAN are allowed to participate in the services that have been certified.

In other words, the subscriber is the policy enabler of the home. Security measures such as password protection may be employed to authenticate the subscriber before permitting use of the interface. Outgoing requests for certificate services are detected by the gateway and, if the requesting device has been authorized for the service via the user interface, the gateway allows the device to utilize the service. The gateway may also transmit an indication to the Service Provider when the service is utilized to facilitate billing.

Figure 4:
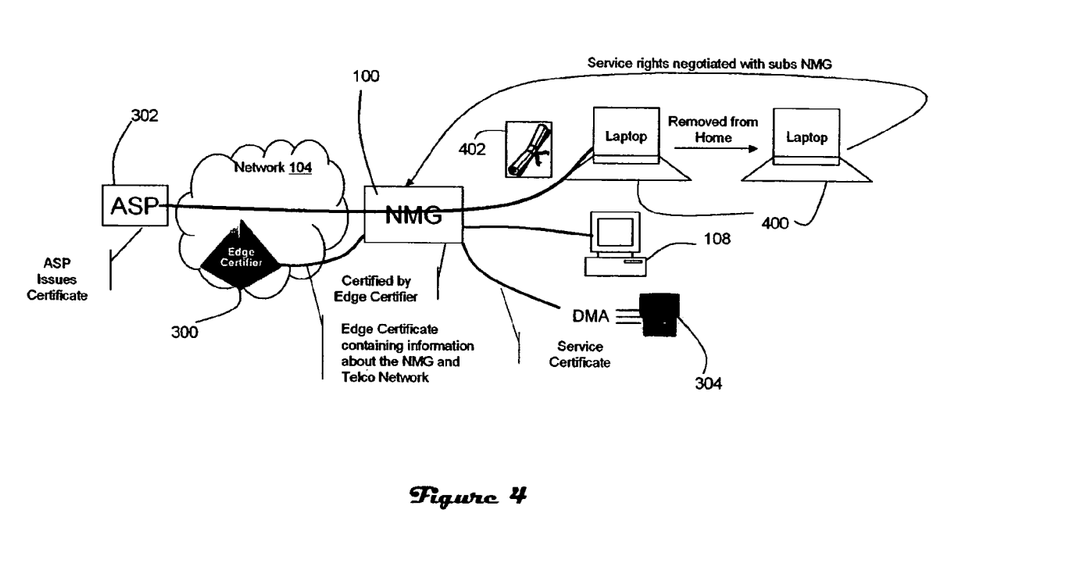
FIG. 4 illustrates certificate security with a mobile subscriber device.

Referring to FIG. 4, certificate management may also be employed to bridge security to a mobile device (400). An agent executed by the gateway monitors the presence of both mobile devices (400) and fixed devices (108) connected to the gateway via the home network. Using the interface (304) associated with the gateway (100), an authenticated subscriber can permit removal of the mobile device (400) from the premises without removal of the security bridge to that mobile device. In particular, in response to subscriber input at the interface (304) the gateway deposits a certificate of mobility (402) on the mobile device. The certificate of mobility identifies the Service Provider and the issuing gateway. At some point after the mobile device is removed from the customer premises LAN, the mobile device may issue a request for services that requires security bridging. The mobile device sends the certificate of mobility to the Service Provider with the service request. Following receipt of the certificate of mobility, the Service Provider determines whether the mobile device is associated with one of its subscribers. The determination is facilitated by examining the gateway identifier in the certificate of mobility and comparing the identified gateway with a record of subscriber gateways. If a match is located, the Service Provider relays the certificate of mobility to the subscriber's gateway. The gateway then validates the incoming mobility certificate and signals to the Service Provider to allow service delivery. The Service Provider will then deliver service to the mobile device.

The technique may also be employed where the relocated mobile device (400) is not directly connected with the network of the certificate-issuing Service Provider. The certificate of mobility provided to the mobile device contains an identifier of the issuing Service Provider and a unique key that identifies the home location of the mobile device. Upon remote re-acquisition of services, assuming a sanctioned removal from the home and through a secure and encrypted channel, the remote device will identify itself to the foreign network, and will make an attempt to contact the home network Service Provider through that foreign network. The home network Service Provider, having knowledge of the partial certificate issued to the mobile device, will then attempt to contact the gateway in the home by referencing the unique home location identifier from the mobile device certificate. At this point the gateway will query the mobile device for a unique authentication key that the subscriber will be required to keep secret. Once the key has been verified, service will be granted. This also enables the protection of issued certificates by extending the security of the network which in turn forms a complete certificate.

Figure 5:
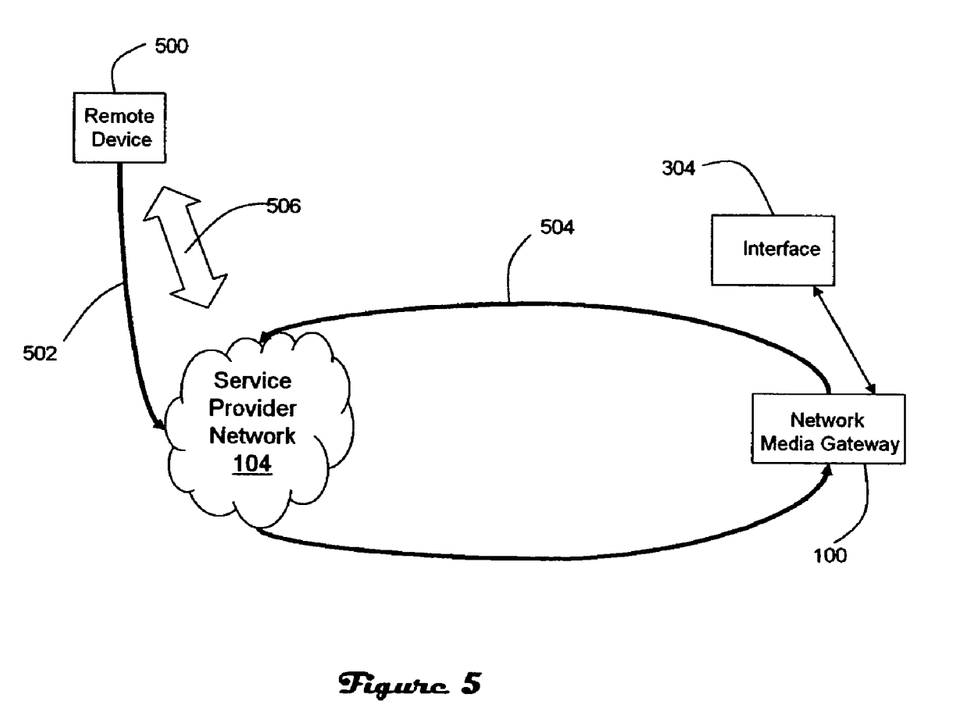
FIG. 5 illustrates authentication of a remote device using a digital co-signature.

Referring now to FIG. 5, trust can also be extended by digital co-signature. A remote device (500) that is not in the home LAN initiates the procedure by requesting authentication from a subscriber associated with the home LAN gateway. In particular, a request (502) for a digital co-signature is transmitted from the requesting remote device to the gateway (100) via the Service Provider network (104). At the subscriber's discretion the co-signature request may be granted, thereby authenticating the requesting device. In response to the grant of digital co-signature by the subscriber, the gateway (100) generates the co-signature (504) which is transmitted to the remote device (500). The co-signature can then be presented to a Service Provider by the requesting device in exchange for the service (506).

The digital co-signature contains encrypted references to the issuing Service Provider and authorizing gateway, and also contains an agent. Once the co-signature is used by the requesting device, that device notifies the authorizing gateway that the transaction has been successfully completed. In particular, the agent residing in the digital co-signature causes the notification to be transmitted to the gateway. The digital co-signature expires immediately after it is used by the third party. In particular, the agent causes the digital co-signature to be destroyed.

The digital co-signature may be based on a Private Key Infrastructure ("PKI") combined with authentication of the subscriber. The PKI is "private" due to the fact that its scope is limited to one edge device and any other requesting internet user for as long as the subscriber wishes to co-sign for that internet user. Any time the internet user wishes to execute a transaction based on the extended trust received from the subscriber, the internet user's platform will be required to renew its trust key. Trust keys may be limited to one-time use to prevent trust abuse and provide the subscriber a degree of distance from the internet user in the event that the relationship between the subscriber and internet user changes. Transactions, both requesting and authenticating, may also be IPSec encapsulated and thus secure.

Figure 6:
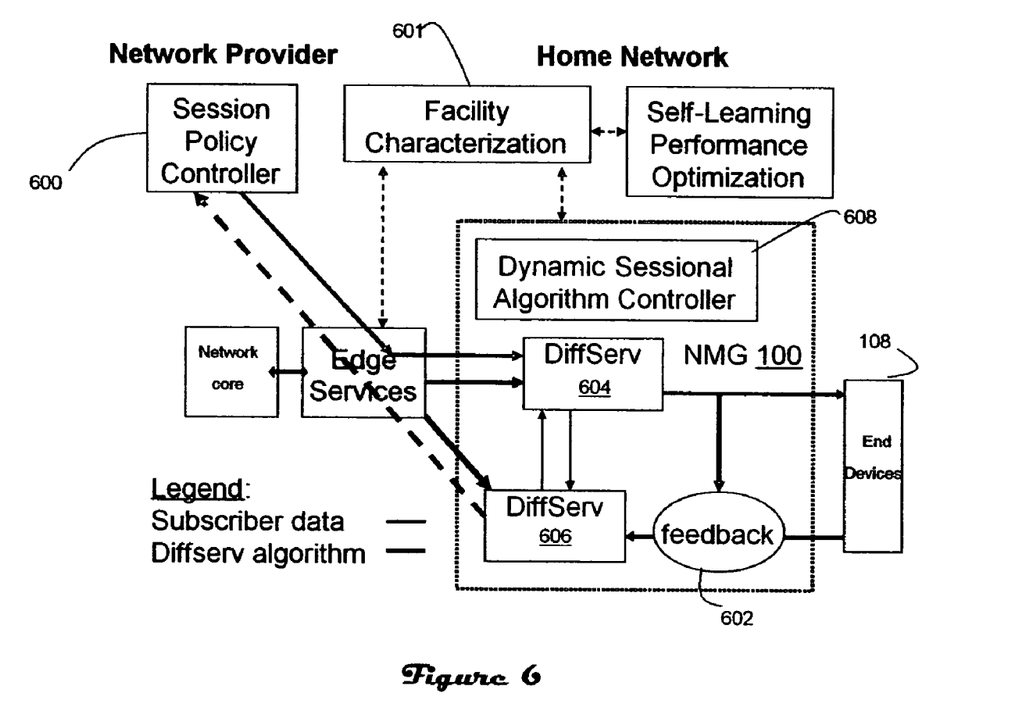
FIG. 6 is a block diagram illustrating the gateway of FIG. 1 in greater detail.

Referring now to FIG. 6, the gateway (100) may also be employed to support self-learning for queuing and application mapping. For example, the gateway may function as a policy enforcement point for delivery of multiple, simultaneous sessions of varying media with differing performance requirements, which may change in real time, with deterministic Quality of Experience ("QoE") such that individual services can be billed. The illustrated embodiment includes a session policy controller (600), an XML agent (601) in the gateway that collects network data, a feedback mechanism (602) that provides the self-learning ability, and a messaging mechanism to report updated models. The authenticated gateway is configured with a default policy and traffic management, e.g., DiffServ (604) configuration by the Service Provider network. The gateway agent learns the behavior of the subscriber's LAN and data usage patterns through observation. Once a usage pattern is recognized, the gateway generates an updated policy and traffic configuration (606). The gateway policy model (606) is continuously updated to provide further refinements in bandwidth usage. The gateway then periodically updates the policy configuration (604) and a Session Policy Controller (608) with the latest policy model (606) associated with the subscriber. Billing options may be offered to the subscriber if the usage model suggests lower cost.

In one embodiment the self-learning policy approach is applied to queue management for the broadband environment by loading a framework algorithm into the gateway. As each new session is selected by the subscriber, a new algorithm module is loaded. The framework algorithm has the ability for time variation in order to support, for example, a subscriber who requests two premium services, Service A and Service B, over a above the standard voice, video and data service. Because the subscriber may not always being using Service A and Service B, the framework algorithm autonomously shifts the queue weightings based on current usage to allow for the proper session service quality levels to be met. For example, when the Service B session ends, the framework algorithm re-shifts the queue weightings. Subsequently, if the subscriber adds a new session called Service C, a C algorithm session is downloaded and the framework again re-shifts the queue weightings. Because the queue algorithms running over time have changing weightings, QoE support is improved relative to static weighting.

Figure 7:
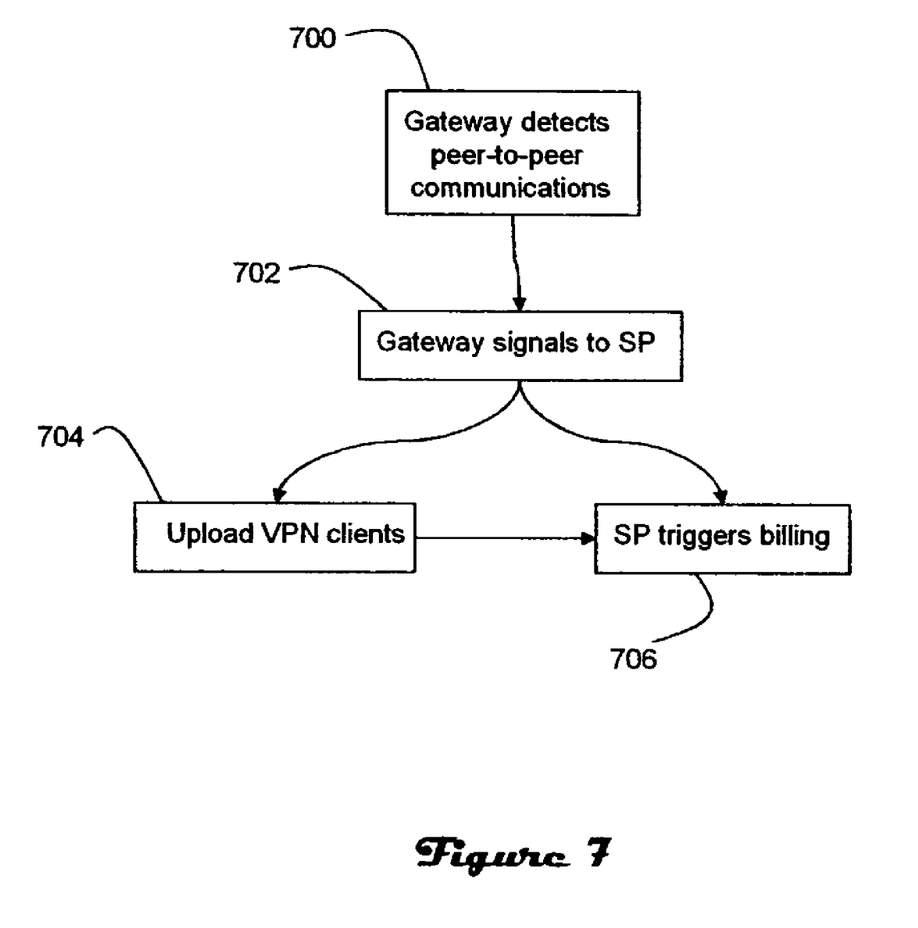
FIG. 7 is a flow diagram illustrating support for peer-to-peer communications.

Referring now to FIG. 7, another aspect of the invention is service creation through adhoc VPN facilitated Peer-to-Peer Networking. An authorized gateway containing a VPN client detects Peer-to-peer applications associated with the subscriber as shown in step (700). In response to detection of operation of a peer-to-peer application the gateway notifies the Service Provider as indicated in step (702). Hence, the Service Provider may institute billing the subscriber for the peer-to-peer services as indicated by step (706). Further, if multiple users are participating in peer-to-peer transactions with the subscriber then the subscriber's gateway can establish a closed VPN network of authorized users as indicated by step (704). The VPN is establish by the gateway uploading a VPN client to each remote user's device. Billing may also be triggered for the VPN service as indicated by step (706).

The remote users participating in the VPN may be associated with gateways on the same Service Provider WAN, or may be on a foreign Service Provider WAN that does not use gateways, provided the initiating subscriber has a gateway. Current advanced peer-to-peer applications get around detection within the network providers network by altering port number. This makes it difficult for network providers to identify and track peer-to-peer sessions on a session by session basis. More simple peer-to-peer applications may not alter port numbers to avoid detection, however the equipment currently existing in the Service Provider's network may not be capable of performing deep packet inspection on every packet transacted. However, the gateway reduces the burden of having to perform deep packet inspection on every packet by monitoring and tagging appropriate flows, and relaying information to the Service Provider.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus for providing communications service from a network or Service Provider to at least one subscriber device, the apparatus comprising:

a gateway device adapted to be authenticated by the network or Service Provider, the authentication of the gateway device based at least in part on a topology of the network and a unique identifier of the gateway device, the gateway device independently authenticating the at least one subscriber device after being authenticated by the network or Service Provider such that an authentication request from the at least one subscriber device is not forwarded to the network or Service Provider, security being bridged from the network or Service Provider to the at least one subscriber device by enabling the gateway device to independently authenticate the at least one subscriber device on behalf of the network or Service Provider.

2. The apparatus of claim 1 wherein the gateway device is disposed at a subscriber premises.

3. The apparatus of claim 1 wherein the gateway device is disposed in a tamper resistant enclosure.

4. The apparatus of claim 1 wherein the at least one subscriber device is authenticated for any content type or service.

5. The apparatus of claim 1 wherein the at least one subscriber device is selected from the group consisting of: a digital media adapter, a personal computer, and a customer premises equipment not located at a subscriber premises.

6. The apparatus of claim 1 wherein the gateway device permits authentication of the at least one subscriber device that is not directly connected with the gateway device.

7. The apparatus of claim 1 wherein the gateway further includes an interface via which a subscriber authenticates the at least one subscriber device for selected services.

8. The apparatus of claim 7 wherein the gateway device operates to detect at least one incoming certificate from the network.

9. The apparatus of claim 8 wherein the gateway device maintains a record of at least some of the at least one detected certificate.

10. The apparatus of claim 9 wherein the interface further operates in response to a subscriber input to authenticate the at least one subscriber device for certificate services.

11. The apparatus of claim 10 wherein the interface further operates to authenticate the at least one subscriber device before allowing use of the interface to authenticate services for the at least one subscriber device.

12. The apparatus of claim 1 wherein the gateway device further operates to bridge security to a mobile device.

13. The apparatus of claim 12 wherein the gateway device further operates to monitor a presence of the at least one subscriber device at a subscriber premises.

14. The apparatus of claim 13 wherein the gateway device further operates to provide a certificate of mobility to an authenticated mobile subscriber device.

15. The apparatus of claim 14 wherein the certificate of mobility includes an identifier associated with the gateway device.

16. The apparatus of claim 15 wherein, in response to a request for service from the mobile device, the network signals to the gateway device to determine whether the mobile device is authenticated for the requested service.

17. The apparatus of claim 16 wherein the gateway device further operates to validate the service request from the mobile device by signaling to the network, in response to which the network provides the service.

18. The apparatus of claim 17 wherein the certificate of mobility further includes a identifier associated with the network, the mobile device forwarding the service request to the network from a foreign network.

19. The apparatus of claim 1 wherein the gateway device further operates in response to a remote request for service authorization from a device not disposed at a subscriber premises to prompt a subscriber that the remote request has been received via an interface.

20. The apparatus of claim 19 wherein the gateway device further operates in response to the authorization of the service request by the subscriber to grant the remote request for service authorization.

21. The apparatus of claim 20 wherein the gateway device further operates to grant the remote request by transmitting a digital co-signature to the requesting device.

22. The apparatus of claim 21 wherein the network further operates in response to the digital co-signature to provide the service.

23. The apparatus of claim 21 wherein the digital co-signature includes an agent that signals to the gateway that the requested service has been provided.

24. The apparatus of claim 21 wherein the digital co-signature includes an agent that causes the co-signature to be destroyed once the co-signature has been used.

25. The apparatus of claim 1 further including logic operating to learn network usage patterns associated with the at least one subscriber device.

26. The apparatus of claim 25 further including a dynamic policy and traffic model that is updated based at least in-part on the learned network usage pattern.

27. The apparatus of claim 26 wherein a queue weighting is updated based at least in-part on the learned network usage pattern.

28. The apparatus of claim 1 further including a traffic analyzer operating to recognize execution of a peer-to-peer communication.

29. The apparatus of claim 28 wherein the gateway device further operates to signal the network to indicate the detection of the peer-to-peer communication.

30. The apparatus of claim 29 wherein the gateway device further operates to establish a virtual private network for peer devices.

31. The apparatus of claim 30 wherein the gateway device further operates to upload a virtual private network client to each of the peer devices.

32. A method performed by a network device in a network for providing communications service from the network to at least one subscriber device, the method comprising the steps of:
    authenticating, by the network device, a gateway device associated with a subscriber premises, the authentication of the gateway device based at least in part on a topology of the network and a unique identifier of the gateway device; and
    after being authenticated by the network device, independently authenticating, by the gateway device, the at least one subscriber device, such that an authentication request from the at least one subscriber device is not forwarded to the network,
    security being bridged from the network to the at least one subscriber device by enabling the gateway device to independently authenticate the at least one subscriber device on behalf of the network.

33. The method of claim 32 wherein the gateway device is disposed at a subscriber premises.

34. The method of claim 32 wherein the gateway device is disposed in a tamper resistant enclosure.

35. The method of claim 32 including the further step of authenticating the at least one subscriber device for at least one service selected from a group consisting of video, voice and data.

36. The method of claim 32 wherein the at least one subscriber device is selected from the group consisting of: a digital media adapter, a personal computer, and a customer premises equipment not located at a subscriber premises.

37. The method of claim 32 including the further step of the gateway device permitting authentication of a subscriber device that is not directly connected with the gateway device.

38. The method of claim 32 wherein the gateway device further includes an interface via which a subscriber may authenticate subscriber devices for selected services.

39. The method of claim 38 including the further step of detecting incoming certificates from the network.

40. The method of claim 39 including the further step of maintaining a record of at least some detected incoming certificates.

41. The method of claim 40 including the further step, in response to subscriber input, of authenticating subscriber devices for certificate services.

42. The method of claim 41 including the further step of authenticating the subscriber before allowing use of the interface to authenticate services for a subscriber device.

43. The method of claim 32 including the further step of bridging security to a mobile device.

44. The method of claim 43 including the further step of monitoring presence of mobile devices at the subscriber premises.

45. The method of claim 44 including the further step of providing a certificate of mobility to an authenticated mobile subscriber device.

46. The method of claim 45 wherein the certificate of mobility includes an identifier associated with the gateway device.

47. The method of claim 46 including the further step of, in response to a request for service from the mobile device, signaling to the gateway device to determine whether the mobile device is authenticated for the requested service.

48. The method of claim 47 including the further step of validating the service request from the mobile device by signaling to the network, in response to which the network provides the requested service.

49. The method of claim 48 wherein the certificate of mobility further includes an identifier associated with the network, the mobile device forwarding the service request to the network from a foreign network.

50. The method of claim 32 wherein the gateway device operates in response to a remote request for service authorization from a device not disposed at the subscriber premises to prompt a subscriber that the request has been received via the interface.

51. The method of claim 50 wherein the gateway device operates in response to authorization of the service request by the subscriber to grant the remote request for a service authorization.

52. The method of claim 51 wherein the gateway device operates to grant the remote request by transmitting a digital co-signature to the requesting device.

53. The method of claim 52 wherein the network operates in response to the digital co-signature to provide a service.

54. The method of claim 52 wherein the co-signature includes an agent that operates to signal to the gateway device that the requested service has been provided.

55. The method of claim 52 wherein the co-signature includes an agent that causes the digital co-signature to be destroyed once the co-signature has been used.

56. The method of claim 32 wherein logic operates to learn a network usage pattern associated with the at least one subscriber device.

57. The method of claim 56 wherein a dynamic policy and traffic model is updated based at least in-part on the learned network usage pattern.

58. The method of claim 57 wherein queue weightings are updated based at least in-part on the learned network usage pattern.

59. The method of claim 32 wherein a traffic analyzer operates to recognize execution of a peer-to-peer communication.

60. The method of claim 59 wherein the gateway device further operates to signal the network to indicate detection of a peer-to-peer communication.

61. The method of claim 60 wherein the gateway device further operates to establish a virtual private network for peer devices.

62. The method of claim 61 wherein the gateway further operates to upload a virtual private network client to each of one or more foreign peer devices.

* * * * *